(12) United States Patent
Kitahara et al.

(10) Patent No.: US 9,012,580 B2
(45) Date of Patent: Apr. 21, 2015

(54) TETRAFLUOROETHYLENE/ HEXAFLUOROPROPYLENE COPOLYMER AND THE PRODUCTION METHOD THEREOF, AND ELECTRICAL WIRE (75) Inventors: Takahiro Kitahara, Settsu (JP); Tadaharu Isaka, Settsu (JP); Ryouichi Fukagawa, Settsu (JP); Keizou Shiotsuki, Orangeburg, NY (US)

(73) Assignees: Daikin Industries, Ltd., Osaka (JP); Daikin America, Inc.NY (US)

( * ) Notice: Subject to any disclaimer, the term of this patent is extended or adjusted under 35 U.S.C. 154(b) by 484 days.

(21) Appl. No.: 12/866,135

(22) PCT Filed: Feb. 9, 2009

(86) PCT No.: PCT/US2009/033555
§ 371 (c)(1),
(2), (4) Date: Aug. 4, 2010

(87) PCT Pub. No.: WO2009/102660
PCT Pub. Date: Aug. 20, 2009

(65) Prior Publication Data
US 2010/0314154 A1 Dec. 16, 2010

Related U.S. Application Data

(60) Provisional application No. 61/029,130, filed on Feb. 15, 2008, provisional application No. 61/092,212, filed on Aug. 27, 2008, provisional application No. 61/146,086, filed on Jan. 21, 2009.

(51) Int. Cl.
*C08F 214/26* (2006.01)
*C08F 214/28* (2006.01)
(Continued)

(52) U.S. Cl.
CPC .............. *H01B 3/307* (2013.01); *C09D 127/18* (2013.01); *C08F 214/26* (2013.01); *C08F 214/28* (2013.01); *C08F 14/26* (2013.01); *C08F 214/262* (2013.01)

(58) Field of Classification Search
USPC .......................................... 526/247, 254, 255
See application file for complete search history.

(56) References Cited

U.S. PATENT DOCUMENTS 4,105,716 A    8/1978  Sakai et al.
4,110,186 A *  8/1978  Arkles et al. ................... 522/156
(Continued)

FOREIGN PATENT DOCUMENTS

EP    1 262 496 A1    12/2002
EP    1 887 040 A1    2/2008
(Continued)

OTHER PUBLICATIONS
Wu "Dynamic Rheology and Molecular Weight Distribution of Insoluble Polymers: Tetrafluoroethylene-Hexafluoropropylene Copolymers", 1985, 18, 2023-2030.*
(Continued)

*Primary Examiner* — Nicole M Buie-Hatcher
(74) *Attorney, Agent, or Firm* — Global IP Counselors (57) ABSTRACT

A tetrafluoroethylene/hexafluoropropylene copolymer has improved moldability in melt extrusion molding, especially with significant reduction of defects in high-speed extrusion coating of an electrical wire. The tetrafluoroethylene/hexafluoropropylene copolymer is obtained by polymerization of at least tetrafluoroethylene and hexafluoropropylene selected from the group consisting of tetrafluoroethylene, hexafluoropropylene and a third monomer without mixing with the resin which has the melting point with the difference of 20 degree C. and more from the melting point of the tetrafluoroethylene/hexafluoropropylene copolymer; and has a complex viscosity of from $2.0 \times 10^3$ to $10.0 \times 10^3$ Pa*s and a storage modulus of from 0.1 to 3.5 Pa*s in melt viscoelasticity measurement under the condition of atmosphere temperature of 310 degree C. and angular frequency of 0.01 radian/second. The tetrafluoroethylene/hexafluoropropylene copolymer can be used in an electrical wire as a coating on a conductive core.

14 Claims, 1 Drawing Sheet

(51) Int. Cl.
*H01B 3/30* (2006.01)
*C09D 127/18* (2006.01)
*C08F 14/26* (2006.01)

(56) References Cited

U.S. PATENT DOCUMENTS

| | | | |
|---|---|---|---|
| 4,380,618 A * | 4/1983 | Khan et al. | 526/206 |
| 4,703,095 A | 10/1987 | Nakagawa et al. | |
| 4,743,658 A * | 5/1988 | Imbalzano et al. | 525/326.4 |
| 5,464,904 A * | 11/1995 | Chapman et al. | 525/200 |
| 5,703,185 A * | 12/1997 | Blair | 526/247 |
| 6,541,588 B1 * | 4/2003 | Kaulbach et al. | 526/250 |
| 6,743,508 B2 * | 6/2004 | Kono et al. | 428/402 |
| 7,122,609 B2 * | 10/2006 | Earnest et al. | 526/254 |
| 7,723,615 B2 | 5/2010 | Kono et al. | |
| 2003/0153701 A1 | 8/2003 | Kono et al. | |
| 2004/0214974 A1 * | 10/2004 | Aten | 526/253 |
| 2004/0242783 A1 | 12/2004 | Yabu et al. | |
| 2004/0254300 A1 | 12/2004 | Namimatsu et al. | |
| 2005/0080211 A1 * | 4/2005 | Earnest et al. | 526/247 |
| 2007/0092714 A1 | 4/2007 | Namimatsu et al. | |
| 2007/0112155 A1 * | 5/2007 | Takase et al. | 526/247 |
| 2007/0208137 A1 | 9/2007 | Kaspar et al. | |
| 2007/0243388 A1 | 10/2007 | Kono et al. | |

FOREIGN PATENT DOCUMENTS

| | | |
|---|---|---|
| JP | 52-98761 A | 8/1977 |
| JP | 52-98792 | 8/1977 |
| JP | 2002-544358 A | 3/1987 |
| JP | 07-70397 A | 3/1995 |
| JP | 7-169334 A | 7/1995 |
| JP | 2004-502853 A | 1/2004 |
| JP | 2009-506067 A | 2/2009 |
| WO | WO-01/36504 A1 | 5/2001 |
| WO | WO-02/04560 A1 | 1/2002 |
| WO | WO-03/022922 A1 | 3/2003 |
| WO | WO-03/022923 A1 | 3/2003 |
| WO | WO-2006/123694 A1 | 11/2006 |

OTHER PUBLICATIONS

Rosenbaum et al. "Rheological characterization of well-defined tetrafluoroethylene/hexafluoropropylene copolymers", Rheol Acta, 1998, 37, 270-288.*

Japanese Office Action of corresponding Japanese Application No. 2010-546848 dated Mar. 13, 2012.

European Search Report of corresponding EP Application No. 09 71 1468.0 dated Feb. 26, 2013.

European Search Report of corresponding EP Divisional Application No. 13 16 8450.6 dated Sep. 19, 2014.

* cited by examiner

TETRAFLUOROETHYLENE/ HEXAFLUOROPROPYLENE COPOLYMER AND THE PRODUCTION METHOD THEREOF, AND ELECTRICAL WIRE

CROSS-REFERENCE TO RELATED APPLICATIONS

This application is a National Stage under 35 U.S.C §371 of International Application No. PCT/US2009/033555, filed on Feb. 9, 2009, which claims the benefit of Provisional Application Nos. 61/029,130, filed on Feb. 15, 2008, 61/092,212, filed on Aug. 27, 2008, and 61/146,086, filed on Jan. 21, 2009, the entire contents of which are hereby incorporated herein by reference.

BACKGROUND OF THE INVENTION

1. Field of the Invention

This invention is related to a tetrafluoroethylene/hexafluoropropylene copolymer and the production method thereof, and an electrical wire.

2. Background Information

A fluororesin has excellent characteristics such as thermal resistance, chemical resistance, solvent resistance, insulation properties and the like. For this reason, the fluororesin is molded into various products such as tubes, pipes, filaments, and the like by melt extrusion molding and the like, and the products are commercially available. In particular, tetrafluoroethylene (abbreviated to "TFE" in the following)/hexafluoropropylene (abbreviated to "HFP" in the following) copolymer (abbreviated to "FEP" in the following) has a lower dielectric constant, a lower dielectric loss tangent and excellent insulation properties than other fluororesins. Therefore, FEP is preferably used for coating of an electrical wire such as a cable, wire and the like.

By the way, improvement of productivity and reduction of cost and the like are currently required in the manufacturing setting for coating the electrical wire and the like. Consequently, various considerations to improve molding speed and to reduce defects are proposed in the manufacturing setting. For instance, polytetrafluoroethylene (abbreviated to "PTFE" in the following) is added to FEP so that from 0.01 to 5 wt % of PTFE is contained in the whole polymer to improve melt fracture phenomena and critical extrusion speed (for example, refer to Japanese Published Unexamined Patent Application No. S52-98761 (1977)), from 0.03 to 2 parts by weight of PTFE is added to 100 parts by weight of FEP or the terpolymer consisting of TFE, HFP and perfluoroalkylvinylether (abbreviated to "PAVE" in the following) to improve coating broken during wire coating process (for example, refer to International Patent Publication Nos. WO 03/22922 and WO 03/22923 pamphlets). These techniques can reduce the size of a lump which is produced between a coating resin and a conductive wire in some degree but they can't reduce the occurrence frequency of the lump substantially.

Moreover, a melt-processable fluororesin composition containing from 0.01 to 3 parts by weight of PTFE with a standard specific gravity of from 2.15 to 2.30 to 100 parts by weight of FEP is prepared to improve moldability in melt extrusion molding, especially to reduce defects significantly in high-speed extrusion coating of an electrical wire (for example, refer to International Patent Publication No. WO 123694 pamphlet). Furthermore, for this melt-processable fluororesin composition, it is necessary to mix PTFE in dispersion liquid with FEP in dispersion liquid.

Additionally, a melt-processable fluororesin composition containing from 0.01 to 5 wt % of a perfluoropolymer to FEP with high molecular weight and with a melting point of over 20 degree C. higher than that of FEP is prepared (for example, refer to Published Japanese translation of a PCT Application No. 2004-502853). Note that it is necessary to mix the perfluoropolymer in dispersion liquid with FEP in dispersion liquid for the melt-processable fluororesin composition. Furthermore, an example of the perfluoropolymer includes FEP with from 2 to 20 wt % of a repeating unit derived from HFP. It is reported that this melt-processable fluororesin composition can remove a lump and can depress piling the lump up in extrusion coating of an electrical wire. However, this melt-processable fluororesin composition can't reduce the occurrence frequency of the lump substantially as well as the melt-processable fluororesin in which PTFE powder is mixed with FEP powder. Moreover, fluctuation of capacitance is larger and the electrical properties of the final products made from the melt-processable fluororesin composition are worse when a smaller lump is produced.

Furthermore, FEP with a relatively high die swell of from 5 to 20% and with a melt flow rate within a specific range is prepared to reduce nonuniformity of a diameter of electrical wire in extrusion coating of the electrical wire (for example, refer to International Patent Publication WO 01/36504 pamphlet). However, a perfluoropolymer with high molecular weight, such as PTFE and the like is not added to this FEP. Additionally, the technique for reducing the occurrence frequency of the lump is not mentioned.

TFE/fluoroalkoxytrifluoroethylene copolymer (abbreviated to "PFA" in the following) composition containing from 0.01 to 30 wt % of PTFE with a crystallization temperature of more than or equal to 305 degree C. is prepared as a fluororesin that can be a raw material for a molded body with an excellent surface flatness (for example, refer to Japanese Published Unexamined Patent Application No. H7-70397 (1995)). However, it is not clear that this PFA composition can give an electrical wire without any defects in high-speed extrusion coating of an electrical wire.

SUMMARY

In view of the above, the objective of the invention is to give a tetrafluoroethylene/hexafluoropropylene copolymer with improved moldability in melt extrusion molding, especially with significant reduction of defects in high-speed extrusion coating of an electrical wire and with manufacturability of an electrical wire with smaller transmission loss (attenuation).

FEP of this invention is FEP obtained from at least TFE and HFP selected from the group consisting of TFE, HFP and a third monomer (a monomer except TFE and HFP), and is melt-processable. This FEP is FEP mainly constituted of TFE and HFP. The third monomer may be copolymerized with TFE and HFP as long as the effect of this invention is maintained.

Examples of the third monomer, without being limiting in any particular way, include perfluorovinylether (abbreviated to "PFVE" in the following), chlorotrifluoroethylene (abbreviated to "CTFE" in the following), vinyl fluoride (abbreviated to "VF" in the following), hexafluoroisobutene and the like.

An example of the PFVE, without being limiting in any particular way, is an unsaturated perfluoro compound of general formula: $CF_2\!=\!CF\!-\!ORf$ (wherein, Rf is an aliphatic perfluoro hydrocarbon group). Note that in this application the aliphatic perfluoro hydrocarbon group is an aliphatic hydrocarbon group in which all hydrogen atoms bonded to carbon atoms are substituted by fluorine atoms. Additionally, the aliphatic perfluoro hydrocarbon group may have an ether oxygen. Furthermore, an example of PFVE is PAVE. PAVE is the compound of general formula: $CF_2=CFO(CF_2)_nCF_3$ (wherein, n is an integer of from 0 to 3 in this application). Examples of PAVE include perfluoro(methylvinylether) (abbreviated to "PMVE" in the following), perfluoro(ethylvinylether) (abbreviated to "PEVE" in the following), perfluoro(propylvinylether) (abbreviated to "PPVE" in the following), and perfluoro (butylvinylether) and the like. Among these, from the perspective of crack resistance, PMVE, PEVE and PPVE are preferred, and PPVE is more preferred.

Furthermore, FEP of this invention is preferably perfluoropolymer, which includes, for example, the polymer constituted of the TFE unit and HFP unit only, the polymer constituted of the TFE unit, HFP unit and PFVE unit only. Among these, from the perspective of improvement of defects, the polymer constituted of the TFE unit, HFP unit and PFVE unit only is more preferred. Note that the TFE unit, HFP unit and PFVE unit are derived from TFE, HFP and PFVE respectively, and constitute FEP. For example, TFE unit is expressed in $—(CF_2CF_2)—$.

In case FEP contains PFVE unit, only one kind of PFVE unit can exist in the FEP, or two or more kinds of PFVE unit can exist in the FEP. Moreover, in the FEP, the weight ratio of TFE unit and HFP unit (total weight of both units is 100) is preferably (70 to 95):(5 to 30), is more preferably (85 to 95):(5 to 15). Furthermore, in case FEP contains a third monomer unit, the concentration of total of the third monomer unit is preferably less than or equal to 10 wt % of the entire monomer unit in general. Furthermore, in case this FEP is constituted of TFE unit, HFP unit and PFVE unit only, the weight ratio of TFE unit, HFP unit and PFVE unit (total weight of these units is 100) is preferably (70 to 95):(4 to 20):(0.1 to 10), is more preferably (75 to 95):(5 to 15):(0.3 to 3). Furthermore, in case PFVE unit contains two or more kinds of units, for example, PMVE unit, PPVE unit and the like, the weight of PFVE unit is based on the total weight of those units. Moreover, in this application, this weight ratio is determined by the measurement of content percentage of TFE unit, HFP unit, PFVE unit and the like respectively with an NMR analyzer (AC300 manufactured by BRUKER BIOSPIN Co., Ltd, high temperature probe) or an infrared spectrometer (type 1760 manufactured by PerkinElmer, Inc.).

FEP of the invention is obtained without mixing with the resin which has the melting point with difference of 20 degree C. or more from the melting point of the FEP. Conversely, FEP of the invention may be mixed with the resin which has the melting point with difference of less than 20 degree C. from the melting point of the FEP.

Furthermore, an example of the method for mixing an arbitrary resin with the FEP, without being limiting in any particular way, is method for mixing the resins in particle, method for mixing the resins in aqueous suspension liquid or aqueous dispersion liquid, method for melting the resins to mix them and the like.

Note that in case that the resins, which have different melting point, are mixed together, it is possible to increase generation of a small lump with increasing the difference between melting points of a plurality of resins to be mixed because of unmelted resin with a higher melting point.

Moreover, a mixing process different from the polymerization process is not necessary to produce the FEP of the invention. For instance, the FEP of the invention can be obtained by multistage polymerization in the polymerization process. For example, in order to produce the FEP of the invention, TFE and HFP are polymerized in a single system so that a melt flow rate (abbreviated to "MFR" in the following) at 372 degree C. of the copolymer formed in the polymerization changes from 0.05-5.0 grams/10 minutes to 10-60 grams/10 minutes to obtain an aqueous dispersion liquid of the FEP. Note that a third monomer can be copolymerized at this time if required. After this, the aqueous dispersion liquid prepared by the above polymerization is dried to give dry powder, and the dry powder is melt-extruded to give FEP of the invention. Note that the aqueous dispersion liquid can be concentrated and the like if required before dried. Thus, without the mixing process different the polymerization process, for example, the advantage that the production process can be simplified and another advantage are obtained. In this polymerization the polymer having a relatively low MFR is polymerized at an early stage, the polymer having a relatively high MFR is polymerized at a late stage. On the contrary, the polymer having a relatively high MFR may be polymerized at the early stage, the polymer having a relatively low MFR may be polymerized at the late stage. The MFR can be adjusted by selecting the condition of the polymerization, such as a polymerization temperature, a polymerization pressure, a concentration of an initiator and the like.

Note that the production method in the production process can be selected without any limitation. For example, an example of the method is suspension polymerization method, solution polymerization method, emulsion polymerization method, supercritical polymerization method or the like. Note that in this case, it is necessary to carry out polymerization so that the component with a melt flow rate at 372 degree C. of from 0.05 to 5.0 g/10 minutes accounts for from 0.1 to 50 parts by weight of the entire copolymer. Furthermore, note that in this case, it is necessary to carry out polymerization so that the difference between the melting point of the component having a melt flow rate at 372 degree C. of from 0.05 to 5.0 grams/10 minutes and the melting point of the polymer at the end of the polymerization is less than 20 degree C. The more preferred difference between those melting temperatures is within 10 degree C. The furthermore preferred difference between those melting temperatures is within 7 degree C. The furthermore preferred difference between those melting temperatures is within 5 degree C. The furthermore preferred difference between those melting temperatures is within 3 degree C.

Note that, in general, a polymer having a lower melting point has a relatively low thermal resistance. Thus, it is preferred that the melting point of the component having a melt flow rate from 0.05 to 5.0 grams/10 minutes is closer to the melting point of the polymer at the end of the polymerization. In other words, it is preferred that the composition distribution of the polymer at the end of the polymerization is uniform.

As mentioned above, FEP of this invention has a melt flow rate of from 10 to 60 g/10 minutes. FEP with this MFR range can give the coated electrical wire with little nonuniformity of a diameter even if an electrical wire is coated in high speed, and can give the product with little fluctuation of capacitance electrically. From the perspective of improvement in molding speed, the more preferred lower limit for the MFR of FEP is 15 grams/10 minutes, the more preferred upper limit for that is 40 grams/10 minutes, the furthermore preferred lower limit for that is 20 grams/10 minutes, the furthermore preferred upper limit for that is 35 grams/10 minutes. In this application, MFR is measured by applying load of 5 kg to approximately 6 grams of FEP at 372 degree C. in a melt index tester conformable to ASTM D1238-98.

Furthermore, FEP of this invention prepared as above exhibits a complex viscosity of from $2.0\times10^3$ to $10.0\times10^3$ Pa*s and a storage modulus of from 0.1 to 3.5 Pa in melt viscoelasticity measurement under the condition of atmosphere temperature of 310 degree C. and angular frequency of 0.01 radian/second. FEP with the range of these complex viscosity and storage modulus has an excellent moldability, and has a tendency to avoid a defect. Moreover, the more preferred lower limit for the complex viscosity is $2.5 \times 10^3$ Pa*s, the furthermore preferred lower limit for that is $3.0 \times 10^3$ Pa*s, the more preferred upper limit for that is $8.0 \times 10^3$ Pa*s, the furthermore preferred upper limit for that is $7.0 \times 10^3$ Pa*s. Still furthermore preferred upper limit for that is $6.5 \times 10^3$ Pa*s. The more preferred lower limit for the storage modulus is 0.2 Pa, the more preferred upper limit for that is 3.0 Pa. The complex viscosity and the storage modulus are determined as the value in the angular frequency of 0.01 radian/second, which is obtained from frequency dispersion measurement under the condition of an atmosphere temperature of 310 degree C., a diameter of parallel plate of 25 mm and a gap of 1.5 mm with a melt viscoelasticity analyzer (MCR-500 manufactured by Physica, Inc.).

Furthermore, a melt tension of FEP of this invention is preferably from 0.08 to 0.16 N because the FEP with this range of the melt tension can avoid formation of a lump produced from tiny resin particles at an outlet in extrusion coating of an electrical wire. The more preferred lower limit for the melt tension is 0.09 N.

In this application, the melt tension is determined by measuring the strand extruded through an orifice with an inner diameter of 2 mm and with a length of 20 mm under the condition of a share rate of 36.5 (1/s) after approximately 50 g of resin is added into a cylinder with an inner diameter of 15 mm maintained at approximately 385 degree C. in a Capilograph.

In case FEP of the invention is obtained as aqueous dispersion liquid, an aqueous media in the aqueous dispersion liquid can be liquid containing water. It can be liquid containing aqueous organic solvent, such as an aqueous alcohol and the like. Of course, it can be liquid containing no aqueous organic solvent.

Furthermore, melt extrusion can be generally carried out under the desired condition as long as pelletization is possible. FEP of this invention can be FEP with an end group, such as $—CF_3$, $—CF_2H$ and the like in at least a chain selected from the group consisting of a main chain and a side chain of the polymer. Additionally, it is preferred that there is few or no thermally unstable end group, such as $—COOH$, $—CH_2OH$, $—COF$, $—CF=CF—$, $—CONH_2$, $—COOCH_3$ and the like in the chain.

The thermally unstable end group causes not only decrement of thermal resistance of the resin but increment of attenuation of the electrical wire obtained from the resin because the thermally unstable end group is chemically unstable. Specifically, it is preferred that the sum of the number of the thermally unstable end group and the number of $—CF_2H$ end group is less than or equal to 50 per $1 \times 10^6$ carbon atoms. It is more preferred that the number of the thermally unstable end group and $—CF_2H$ end group is less than 20 per $1 \times 10^6$ carbon atoms. And it is furthermore preferred that the number of the thermally unstable end group and $—CF_2H$ end group is less than or equal to 5. All of the thermally unstable end group and $—CF_2H$ end group described above can be replaced with $—CF_3$ end group.

The thermally unstable end group and $—CF_2H$ end group can be stabilized by converting to $—CF_3$ end group in fluorination treatment. An example of the fluorination treatment, without being limiting in any particular way, is the method that a polymer is exposed to a fluorine radical source which generates fluorine radical under the condition of the fluorination treatment. Examples of the fluorine radical source described above include fluorine gas, $CoF_3$, $AgF_2$, $UF_6$, $OF_2$, $N_2F_2$, $CF_3OF$ and halogen fluoride such as $IF_5$, $ClF_3$ and the like, for example.

Among these, the method that fluorine gas is directly contacted with the FEP of this invention is preferred. From the perspective of controlling reaction, it is preferred that diluted fluorine gas with a fluorine concentration of from 10 to 50 wt % is used. The diluted fluorine gas can be obtained by diluting fluorine gas with inert gas such as nitrogen gas, argon gas and the like. The fluorine gas treatment can be generally carried out at temperature of from 100 to 250 degree C. for example. Note that the treatment temperature, without being limiting in the temperature range above, can be determined depending on the situation.

The fluorine gas treatment is preferably carried out with supplying the diluted fluorine gas into a reactor continuously or intermittently. This fluorination treatment can be carried out to dry powder after polymerization or melt-extruded pellet.

FEP of this invention has excellent moldability and gives few defects. Additionally, the FEP has excellent thermal resistance, chemical resistance, solvent resistance, insulation properties, electrical characteristics and the like. Consequently, this FEP can be used as, for example, a coating material for electrical wires, foamed wires, cables, wires and the like, and molding material for tubes, films, sheets, filaments and the like.

Furthermore, FEP of this invention can significantly reduce defects that have been a problem, such as coating broken, spark out, generation of lumps, fluctuation of capacitance and the like without slowing down the coating speed in extrusion coating of an electrical wire. Therefore, this FEP is particularly used for extrusion coating of an electrical wire. Conventional defects are acknowledged as a problem in high speed coating at the coating speed of from 1,000 feet/minute to 3,000 feet/minute. FEP of this invention can be applied to the extrusion coating of an electrical wire with few defects even in high speed molding. Furthermore, FEP of this invention can carry tiny resin particles from an outlet of an extruder before the tiny resin particles agglutinate to become a lump even when the tiny resin particles generate around the outlet in case the FEP is applied to the extrusion coating of an electrical wire. Hence, employment of this FEP contributes to manufacturing an electrical wire having significantly fewer lumps than ever before. Moreover, FEP of this invention can be also applied to extrusion molding for a foamed wire. In this case, homogeneous foam formation (porosity) can be realized and foaming rate can be improved. Furthermore, employment of this FEP contributes to manufacturing a thinner foamed wire with excellent molding stability in high speed. This is attributed to difficulty to break foam by a core agent for foaming and difficulty to break resin coating because of improvement of melt tension.

A conductive wire is coated with FEP of this invention to obtain an electrical wire of this invention. Additionally, examples of the electrical wire of this invention, without being limiting in any particular way as long as the electrical wire is constituted with a conductor (core wire) and FEP of this invention as coating material, include cables, wires and the like. The electrical wire like this can be preferably employed as an electrical insulated wire for communication. An example of the electrical insulated wire for communication is a cable for connecting a computer and a peripheral device, such a cable for data transfer like LAN cable. Such a cable is preferably used as a plenum cable wired under the roof (plenum area) and the like. Examples of the electrical wire of this invention include a high-frequency coaxial cable, a flat cable and a cable with thermal resistance and the like. Among these, the high-frequency coaxial cable is preferred. Examples of an outer layer of the coaxial cable, without being limiting in any particular way, include a conductive layer made of an external conductor such as metal mesh, a resin layer (sheath layer) made from a resin, for example, fluorine-containing copolymer having TFE unit such as TFE/HFP copolymer, TFE/PAVE copolymer and the like, polyvinyl chloride (abbreviated to "PVC" in the following), polyethylene (abbreviated to "PE" in the following) and the like.

The coaxial cable can have an outer conductive layer made from a metal around the coated wire of this invention described above and the resin layer (sheath layer) described above around the outer conductive layer.

In the coated electrical wire of this invention, the coated layer can be nonfoamed. When the coated layer described above is foamed, a coated electrical wire having smaller transmission loss can be obtained. The foam body described above preferably has a foaming rate of from 10 to 80%. The foam body described above preferably has an average diameter of pore of from 5 to 100 μm.

In this application, the foaming rate is defined as a percentage of change of specific gravity before and after foaming, and is the percentage of change between a specific gravity of a material making a foamed body and an apparent specific gravity of the foamed body measured in water displacement method. The average diameter of pore can be obtained from microscope photograph in cross-section. The coating layer described above can be foamed in well-known method. Examples of the method include, for example, (1) method that a pellet, which is ready prepared from the FEP of this invention added nucleating agent, is extrusion-molded with introducing gas continually, (2) method that a chemical foaming agent is degraded to generate gas to obtain a foamed body by extrusion-molding the FEP of this invention which is mixed with the chemical foaming agent while the FEP of this invention is in melt state. Examples of the nucleating agent in the method (1) described above include well-known boron nitride (BN) and the like. Examples of the gas described above include, for example, chlorodifluoromethane, nitrogen, carbon dioxide, and the mixture of these. Examples of the chemical foaming agent in the method (2) described above include, for example, azodicarbonamide, 4,4'-oxybis-benzenesulfonylhidradide. The conditions in each method, such as the additive quantity of the nucleation agent and the introduction quantity of the gas in the method (1) described above, the additive quantity of the chemical foaming agent in the method (2) described above and the like can be arbitrarily adjusted depending upon kind of a resin and core cable used and a thickness of desired coated layer.

Examples of the material for cable core for the electrical wire of the invention, without being limiting in any particular way, include metallic conductive material, such as copper, silver and the like. The size of the core cable is preferably from AWG 10 to 50 in the electrical wire of this invention. The coating in the electrical wire of this invention is FEP of the invention. This FEP is preferably perfluoropolymer, is more preferably perfluoropolymer constituted of TFE unit, HFP unit and PFVE unit. The thickness of the coating is preferably from 1.0 to 40 mil in the electrical wire of the invention.

Another coating layer can be formed on the coating layer of FEP, another coating layer can be formed between a core cable and the coating layer of FEP in this electrical wire of this invention. Another coating layer can be a resin layer made from a resin, such as TFE/PAVE copolymer, TFE/ethylene copolymer, vinylidene fluoride, polyolefin such as PE, PVC and the like, without being limiting in any particular way. Among these, PE and PVC are preferred from perspective of cost. The thickness of the coating layer of FEP and that of another coating layer can be, without being limiting in any particular way, from 1 mil to 20 mil.

The electrical wire of this invention can be manufactured by extrusion coating at coating speed of from 100 to 3,000 feet/minute. The FEP of this invention has little nonuniformity of a diameter during the extrusion coating, and has the process capability index (abbreviated to "Cp" in the following) of greater than or equal to 1.0 in measurement of the nonuniformity of a diameter even in the above range of extrusion coating speed. Additionally, note that Cp in measurement of the nonuniformity of a diameter is analyzed with USYS 2000 (manufactured by Zumbach Inc.) with a tolerance of from −0.5 mil to +0.5 mil after a core cable with a diameter of 20.1 mil is coated with the FEP of this invention with a single screw extruder (manufactured by Davis Standard Inc.) for 2 hours so that the diameter of the final wire is 34.5 mil and the outer diameter of the electrical wire is measured with the outer diameter analyzer ODAC15XY (manufactured by Zumbach Inc.).

The electrical wire of this invention has Cp of greater than or equal to 1.0 in measurement of capacitance in case of a size of core cable of from AWG 22 to 26 and a thickness of coating layer of from 3.0 to 8.0 mil. Cp in measurement of capacitance is analyzed with a tolerance of from −1.0 pf/inch to +1.0 pf/inch after data obtained by capacitance measurement with the capacitance analyzer of Capac HS (Type: MR20.50HS, manufactured by Zumbach Inc.) for 2 hours are stored in USYS2000 (manufactured by Zumbach Inc.).

Furthermore, there is not formation of greater than or equal to 200 lumps with the height of from 10 to 50 mil on the electrical wire while the electrical wire of this invention is manufactured by extrusion coating at coating speed of from 1,000 to 3,000 feet/minute for 20 hours continuously. For example, the total number of a lump generated is less than or equal to 20, or less than or equal to 10 according in certain instances when a core cable with a diameter of from 18.0 to 24.0 mil is extrusion-coated with the FEP of this invention so that the diameter of the final wire is from 30.0 to 40.0 mil at the speed in such range for 2 hours continuously. Note that, in this application, size (height) and occurrence frequency of a lump are measured with the lump detector of KW32TRIO (manufactured by Zumbach Inc.).

As mentioned above, the FEP of this invention can improve moldability in melt extrusion molding, and can especially significantly reduce defects in high-speed extrusion coating of an electrical wire.

Furthermore, the FEP of this invention can realize production of an electrical wire with smaller transmittance loss (attenuation). Moreover, this FEP has excellent thermal resistance, chemical resistance, solvent resistance, insulation properties, electrical characteristics and the like. Furthermore, the coating material of the electrical wire (including foamed wire) of this invention is the FEP of this invention. For this reason, this electrical wire gives few defects, and has excellent thermal resistance, chemical resistance, solvent resistance, insulation properties, electrical characteristics and the like.

DESCRIPTION OF EMBODIMENTS

Figure 1:
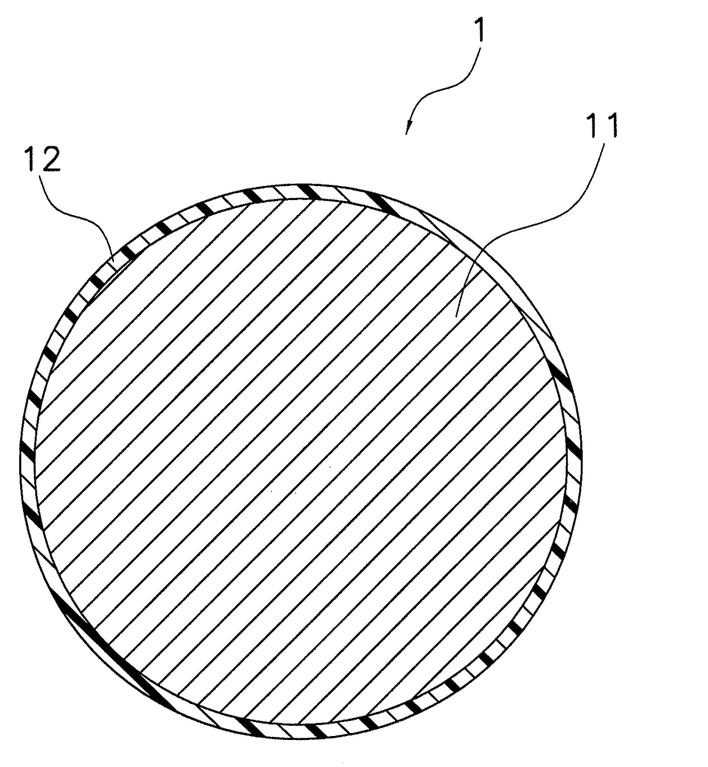
FIG. 1 is a cross-sectional view of an electrical wire in accordance with the present invention.

The invention is explained below in more detail with working examples and comparative examples. Note that the invention is not limited to these working examples only. Note that "part(s)" means "part(s) by weight" in the following as long as there is no definition about the word. The tetrafluoroethylene/hexafluoropropylene copolymer(s) discussed herein are useful in an electrical wire 1 as a coating 12 on a conductive core 11, shown in FIG. 1, and discussed in examples below. However, uses of the tetrafluoroethylene/hexafluoropropylene copolymer(s) should not be limited by this disclosure. Moreover, the specific examples of electrical wires disclosed herein should not limit the present invention.

Working Example 1

Synthesis Example 1

8163.5 lbs. of deionized water (including 3.5 lbs. of ammonium ω-hydroxyfluorocarbonate) was added into a glass-lined autoclave with an agitator (12,000 L volume). After that, the autoclave was vacuumed and filled with nitrogen gas well. After this, after the autoclave was vacuumed, 8459 lbs. of HFP was added into the autoclave. While the deionized water and HFP were agitated vigorously in the autoclave, the inner temperature was set at 89.6 F and 950 lbs. of TFE and 92 lbs. of PPVE were added into the autoclave. Next, the inner pressure of the autoclave was set at 150.6 psi, and 51.8 lbs. of 8 wt % di(ω-hydroperfluorohexanoyl) peroxide (abbreviated to "DHP" in the following) perfluorohexane solution was added into the autoclave to initiate polymerization. 51.8 lbs. of 8 wt % DHP perfluorohexane solution was added into the autoclave, and 1.7 psig of the inner pressure was reduced 2 hours later and 4 hours later from the initiation of the polymerization. Furthermore, 39.8 lbs. of 8 wt % DHP perfluorohexane solution was added into the autoclave, and 1.7 psig of the inner pressure was reduced 6 hours later, 8 hours later and 10 hours later from the initiation of the polymerization. Moreover, 2.5 psig of the inner pressure was reduced respectively in ninth and twelfth addition of DHP perfluorohexane solution counted from the addition of DHP perfluorohexane solution at the initiation of polymerization. Note that TFE was continuously charged into the autoclave during the polymerization, 21.1 lbs. of PPVE was added into the autoclave respectively at the time that the total quantity of TFE reached 1,640 lbs., 3,280 lbs. and 4,920 lbs. After a small quantity of sample was collected from the autoclave at the time that the further additional quantity of TFE reached 1,280 lbs., the sample was dried to obtain 100 grams of dry powder, and the melt flow rate at 372 degree C. of the dry powder was measured. The value of the melt flow rate was 2.0 grams/10 minutes. Furthermore, the quantity of polymer at this time corresponds to 16.8 wt % of the quantity of the polymer at the end of the polymerization. Moreover, the melting point of the dry powder was 256.2 degree C. After this, 85 lbs. of methanol was added into the autoclave to adjust the molecular weight.

Furthermore, after a small quantity of sample was collected from the autoclave at the time that the further additional quantity of TFE reached 4,100 lbs. and 5,740 lbs., the samples were dried to obtain 100 grams of dry powder respectively, and the melting point of the dry powders was measured. The melting point of the dry powder at the time that the further additional quantity of TFE reached 4,100 lbs. was 257.2 degree C. The melting point of the dry powder at the time that the further additional quantity of TFE reached 5,740 lbs. was 257.8 degree C. The polymerization was terminated when the total quantity of TFE reached 7,600 lbs. After the termination of the polymerization, unreacted TFE and HFP were released from the autoclave to obtain wet powder. Water was added to the wet powder to wash it in agitation. After this, the wet powder was dried at 150 degree C. for 10 hours to obtain 8,800 lbs. of dry powder. The melt flow rate at 372 degree C. of the dry powder was 14.2 grams/10 minutes. Furthermore, the melting point of the dry powder was 256.8 degree C. After this, after the dry powder was pelletized at 370 degree C. with a twin screw extruder, the deaeration of the pellet was carried out at 200 degree C. for 8 hours. The melt flow rate at 372 degree C. of the pellet was 22.9 grams/10 minutes.

Measurement of Properties (1) Measurement of Basic Properties

Note that the basic properties of the FEP obtained from the synthesis example 1 as above mentioned was measured by the method described below.

(a) Melting Point

A melting point was determined from a peak of endothermic curve obtained by thermal measurement at a temperature increase rate of 10 degree C./minute with differential scanning calorimeter of RDC220 (manufactured by Seiko Instruments Inc.) in conformity with ASTM D-4591.

(b) Melt Flow Rate (MFR)

The melt flow rate is measured with a melt index tester (manufactured by Toyo Seiki Seisaku-sho, Ltd.) in conformity with the ASTM D1238-98. First, approximately 6 g of a resin is inserted into a cylinder maintained at 372 degree C. The cylinder is left for 5 minutes to reach thermal equilibrium. After that, the resin is extruded through an orifice with a diameter of 2 mm and a length of 8 mm applying piston load of 5 kg to the cylinder to measure quantity (gram) of the resin extruded per certain time (normally from 10 to 60 seconds). The measurement is repeated three times about the same samples. The extrusion quantity per 10 minutes converted from the average of the measurement values (unit: g/10 minutes) is regarded as the final measurement value.

(c) Composition

The composition was determined from integration values at each peak obtained from $^{19}$F-NMR measurement at a temperature of (melting point of polymer+20) degree C. with a nuclear magnetic resonance apparatus of AC300 (manufactured by BRUKER-BIOSPIN Co., Ltd)

As a result, the composition of the FEP of the synthesis example 1 described above was TFE 87.9:HFP 11.1:PPVE 1.0 in weight ratio.

(d) Melt Tension

Approximately 50 grams of FEP of the synthesis example 1 described above was inserted into a cylinder with an inner diameter of 15 mm maintained within 385 degree C.+/−0.5 degree C. The cylinder was left for 10 minutes to even out the temperature in the FEP. After that, a strand was obtained by extruding the FEP through an orifice with an inner diameter of 2 mm (tolerance: less than or equal to 0.002 mm) and a length of 20 mm at share rate of 36.5 (1/sec) in a Capilograph (manufactured by ROSAND inc). Next, this strand was passed to the pulley just under the outlet of the orifice at a distance of 45 cm from the outlet of the orifice, and was pulled obliquely upward at an angle of 60 degree, and was wound on the roller approximately on a level with the outlet of the orifice. The melt tension was defined as the maximum value of the values of tension measured under the condition that the take-up speed of the roller was increased from 5 m/minute to 500 m/minute for 5 minutes. As a result, the melt tension of the FEP of the synthesis example 1 described above was 0.11 N.

(e) Complex Viscosity and Storage Modulus

First, the FEP of the synthesis example 1 was molded into a cylindrical column with a diameter of 25 mm and a thickness of 1.5 mm (this molded body is called "sample" in the following). The sample was placed on a parallel plate of a melt viscoelasticity analyzer (MCR-500 manufactured by Physica, Inc.). Melt viscoelasticity of the sample was measured at 310 degree C. by frequency dispersion with the range of an angular frequency of 100 radian/second to 0.01 radian/second. The value of complex viscosity and storage modulus was defined as the value at the angular frequency of 0.01 radian/second. As a result, the complex viscosity of the FEP of the synthesis example 1 described above was $3.35 \times 10^3$ Pa*s, and the storage modulus was 0.38.

(2) Online Evaluation for Extrusion Coating

Next, extrusion coating an electrical wire was carried out using the FEP of the synthesis example 1 described above as a coating material. Some online measurements were performed as described below during the extrusion coating of the electrical wire.

The condition for the extrusion coating an electrical wire is the following.

a) Conductive core: a low-carbon steel wire, AWG24 (American Wire Gauge), diameter of the wire: 20.1 mil
b) Coating thickness: 7.2 mil
c) Diameter of a coated electrical wire: 34.5 mil
d) Take-over speed of an electrical wire: 1,800 feet/minute
e) Condition for melt molding (extrusion)
Diameter of a shaft of cylinder=2 inches. Single screw extruder with L/D of 30
Die (inner diameter)/tip (external shape)=8.71 mm/4.75 mm
Preset temperature of the extruder: barrel part of Z1 (338 degree C.), barrel part of Z2 (360 degree C.), barrel part of Z3 (371 degree C.), barrel part of Z4 (382 degree C.), barrel part of Z5 (399 degree C.), clamp part (404 degree C.), adapter part (404 degree C.), crosshead part (404 degree C.), die part (404 degree C.), preheating temperature for a core cable (140 degree C.)
length of a melt cone during the extrusion coating=from 3.7 to 4.0 mm (a) Measurement of Spark Out The number of occurrence of a spark on an uncoated part of the extrusion coated wire chilled in an air cooling zone and a water cooling zone with a length of approximately 6 meters was measured with a Spark detector (Model HF-20-H manufactured by CLINTON INSTRUMENT COMPANY) at a voltage of 2.0 kv for 2 hours continually. As a result, the number of occurrence of a spark was 0 per 2 hours when the FEP of the synthesis example 1 described above was used as a coating material.

(b) Measurement of Size (Height) and Frequency of Occurrence of a Lump

Size (height) and frequency of occurrence of a lump were measured with a lump detector of KW32TRIO (manufactured by Zumbach Inc.) for 2 hours continually. As a result, the generation status of the lump in case that the FEP of the synthesis example 1 described above was used as a coating material was shown in table 1.

TABLE 1

| Height of lump (mil) | Number of occurrence (/2 hours) |
|---|---|
| More than or equal to 10 mil, less than 20 mil | 5 |
| More than or equal to 20 mil, less than 30 mil | 1 |
| More than or equal to 30 mil, less than 40 mil | 1 |
| More than or equal to 40 mil, less than 50 mil | 1 |

(c) Measurement of Nonuniformity of a Diameter of Extrusion Coated Wire

The outer diameter (OD) of the extrusion coated wire was measured with an outer diameter measuring instrument of ODAC 15XY (manufactured by Zumbach Inc.) for 2 hours continually. The stability of the diameter of the extrusion coated wire was defined as a process capability index (abbreviated to "Cp" in the following). Note that Cp was analyzed with USYS 2000 (manufactured by Zumbach Inc.) from data of the outer diameter measured under the condition that an upper limit for a diameter of a wire (USL) was set 0.5 mil higher than the extrusion coated wire described above with a diameter of 34.5 mil and a lower limit for the diameter of the wire (LSL) was set 0.5 mil lower than the extrusion coated wire described above. As a result, the stability of the diameter of the extrusion coated wire (Cp) in case that the FEP of the synthesis example 1 described above was used as a coating material was 1.3.

(d) Measurement of Nonuniformity of a Capacitance

The capacitance of the extrusion coated wire was measured with a capacitance measuring instrument of Capac HS (Type: MR20.50HS manufactured by Zumbach Inc.) for 2 hours continually. The stability of the capacitance of the extrusion coated wire was defined as a process capability index (Cp). Note that Cp was analyzed under the condition that an upper limit (USL) was set +1.0 pf/inch and a lower limit (LSL) was set −1.0 pf/inch after data was stored into USYS 2000 (manufactured by Zumbach Inc.) sequential 1 y. As a result, the stability of the capacitance of the extrusion coated wire (Cp) in case that the FEP of the synthesis example 1 described above was used as a coating material was 1.6.

(e) Generation Quantity of Die-Drool

Generation quantity of Die-Drool was determined by visual observation for 2 hours continually. As a result, generation of Die-Drool was very few while the FEP of the synthesis example 1 described above was used as a coating material.

Working Example 2

Synthesis Example 2

After the pellet obtained in the synthesis example 1 was inserted into a vacuum vibration type reactor of VVD-30 (manufactured by OKAWARA MFG. CO., LTD.), the pellet was heated to 200 degree C. After the reactor was vacuumed, $F_2$ gas diluted by 20 wt % with $N_2$ gas was introduced into the reactor up to the atmospheric pressure. $F_2$ gas was introduced again after the reactor was vacuumed three hours later from the first introduction of $F_2$ gas. The operation of the $F_2$ gas introduction described above and vacuuming was carried out 6 times. After the reaction was completed, $F_2$ gas in the reactor was replaced with $N_2$ gas and deaeration of the pellet was carried out at 180 degree C. for 8 hours. The composition of the pellet after the reaction was TFE 87.9:HFP 11.1: PPVE 1.0 in weight. The melting point was 256.8 degree C. The MFR at 372 degree C. was 23.5 g/10 minutes. The sum of the number of thermally unstable end group and the number of —$CF_2H$ end group per $1×10^6$ carbon atoms was 0. The dielectric constant was 2.00. The dielectric tangent was $3.8×10^{-4}$.

Moreover, the melt tension was 0.11 N, the complex viscosity was $3.30×10^3$ Pa*s, and the storage modulus was 0.36.

Production Example 1

Wire coating was carried out using the FEP of the synthesis example 2 described above as an insulating coating material (core material). After this, a single braid was formed onto the FEP and then the FEP of the synthesis example 2 as a protective coating (sheath material) was coated onto the single braid to prepare a coaxial cable of RF113.

The attenuation of the coaxial cable obtained was measured with a network analyzer of HP8510 C (Hewlett-Packard Development Company, L.P.). As a result, the attenuation was 5.1 dB/meter at 6 GHz.

The condition for the extrusion coating an electrical wire (core material) is the following.

a) Conductive core: copper coated with silver (7/0.08 mm twisted conductive wire)
b) Coating thickness: 0.23 mm
c) Diameter of an insulated electrical wire: 0.7 mm
d) Take-over speed of an electrical wire: 60 meters/minute
e) Condition for melt molding (extrusion)
Diameter of shaft of cylinder=2 inches
rotational speed of screw: 10 rpm
Preset temperature of the extruder: barrel part of Z1 (325 degree C.), barrel part of Z2 (340 degree C.), barrel part of Z3 (350 degree C.), barrel part of Z4 (365 degree C.), barrel part of Z5 (370 degree C.), clamp part (380 degree C.), adapter part (380 degree C.), crosshead part (380 degree C.), die part (370 degree C.), preheating temperature for a core cable (140 degree C.)

Measuring Method for the Number of the Thermally Unstable End Group

A film with a thickness of approximately 0.3 mm was prepared by extending the pellet by applying pressure with a hydraulic press. The film was analyzed with the FT-IR Spectrometer 1760X (manufactured by Perkin-Elmer Inc.).

A differential spectrum between a reference (a sample fluorinated enough until any substantial difference of spectrums between samples was not able to be seen) and a sample was obtained. Absorbance of each peak was read and then the number of thermally unstable end group per $1×10^6$ carbon atoms was calculated from the following formula. The number of thermally unstable end group per $1×10^6$ carbon atoms= (I×K)/t (I; absorbance, K; correction coefficient, t; thickness of film (unit: mm))

The correction coefficient (K) for each thermally unstable end group is described below.
—COF ($1,884 cm^{-1}$)—405
—COOH ($1,813 cm^{-1}$, $1,775 cm^{-1}$)—455
—$COOCH_3$ ($1,795 cm^{-1}$)—355
—$CONH_2$ ($3,438 cm^{-1}$)—480
—$CH_2OH$ ($3,648 cm^{-1}$)—2,325

Measuring Method for the Number of the —$CF_2H$ End Group

The number of the —$CF_2H$ end group was determined from the integration value at the peak derived from the —$CF_2H$ end group and the integration value at another peak obtained from $^{19}F$-NMR measurement at a temperature of (melting point of polymer+20) degree C. with a nuclear magnetic resonance apparatus of AC300 (manufactured by BRUKER-BIOSPIN Co., Ltd)

Measuring Method for Dielectric Constant and Dielectric Tangent

A cylindrical test piece with a diameter of 2.3 mm and a length of 80 mm was prepared by melt extrusion at 280 degree C. The electrical characteristics at 6.0 GHz of the test piece was measured with a network analyzer (manufactured by Kantoh Electronics Application and Development Inc.) in the cavity resonance perturbation method (test temperature: 25 degree C.).

Working Example 3

Synthesis Example 3

The FEP was synthesized in the same manner as in the synthesis example 1. Then, in the same manner as in the synthesis example 1, the melt flow rate at 372 degree C. of the dry powder was measured at the time that the further additional quantity of TFE reached 1,280 lbs. The value of the melt flow rate was 2.2 grams/10 minutes. Moreover, the melting point of the dry powder was 255.7 degree C. After this, 105 lbs. of methanol was added into the autoclave to adjust the molecular weight.

Furthermore, in the same manner as in the synthesis example 1, after a small quantity of sample was collected from the autoclave at the time that the further additional quantity of TFE reached 4,100 lbs. and 5,740 lbs., the samples were dried to obtain 100 grams of dry powder respectively, and the melting point of the dry powders was measured. The melting point of the dry powder at the time that the further additional quantity of TFE reached 4,100 lbs. was 255.4 degree C. The melting point of the dry powder at the time that the further additional quantity of TFE reached 5,740 lbs. was 256.8 degree C.

Additionally, dry power was obtained at the end of the polymerization in the same manner as in the synthesis example 1, and the melt flow rate at 372 degree C. of the dry powder was measured to be 24.0 grams/10 minutes. Furthermore, the melting point of the dry powder was 256.4 degree C.

After this, after the dry powder was pelletized at 396 degree C. with a single screw extruder, and the deaeration of the pellet was carried out at 200 degree C. for 8 hours. The melt flow rate at 372 degree C. of the pellet was 26.7 grams/10 minutes.

Measurement of Properties (1) Measurement of Basic Properties

Note that the basic properties of the FEP obtained from the synthesis example 3 was measured by the measuring method shown in the working example 1. The composition of the FEP of the synthesis example 3 was TFE 87.9:HFP 11.1:PPVE 1.0 in weight ratio as is the same as the composition of the FEP of the synthesis example.

Additionally, the melt tension, the complex viscosity, and the storage modulus of the FEP obtained in the synthesis example 3 were also determined in the same manner as in the working example 1. As a result, the melt tension was 0.13N, the complex viscosity was $4.78×10^3$ Pa*s, and the storage modulus was 1.12.

(2) Online Evaluation for Extrusion Coating

Extrusion coating an electrical wire was carried out using the FEP of the synthesis example 3 in the same manner as in the working example 1. After this, evaluation for the extrusion coating was carried out in the same manner as in the working example 1. As a result, the frequency of occurrence of a lump was shown in table 2. The stability of the diameter of the extrusion coated wire (Cp) was 1.2. The stability of the capacitance of the extrusion coated wire (Cp) was 1.3. Generation of Die-Drool was very few.

TABLE 2

| Height of lump (mil) | Number of occurrence (/2 hours) |
|---|---|
| More than or equal to 10 mil, less than 20 mil | 4 |
| More than or equal to 20 mil, less than 30 mil | 0 |
| More than or equal to 30 mil, less than 40 mil | 1 |
| More than or equal to 40 mil, less than 50 mil | 1 |

Working Example 4

Synthesis Example 4

The pellet was treated in the same as in the synthesis example 2 except that the pellet obtained in the synthesis example 1 was replaced with the pellet obtained in the synthesis example 3.

The composition of the pellet after the reaction was TFE 87.9:HFP 11.1: PPVE 1.0 in weight. The melting point was 255.8 degree C. The MFR at 372 degree C. was 27.5 g/10 minutes. The sum of the number of thermally unstable end group and the number of —$CF_2H$ end group per $1×10^6$ carbon atoms was 0. The dielectric constant was 2.02. The dielectric tangent was $3.8×10^{-4}$.

Moreover, the melt tension was 0.13 N, the complex viscosity was $4.63×10^3$ Pa*s, and the storage modulus was 1.08.

Note that the measuring method of the number of thermally unstable end group, the measuring method of the number of —$CF_2H$ end group, and the measuring method of the dielectric constant and the dielectric tangent are as indicated in the production example 1.

Production Example 2

A coaxial cable of RF113 was prepared in the same manner as in the production example 1 except that the FEP of the synthesis example 2 was replaced with the FEP of the synthesis example 4.

The attenuation of the coaxial cable obtained was measured with a network analyzer of HP8510C (Hewlett-Packard Development Company, L.P.). As a result, the attenuation was 5.2 dB/meter at 6 GHz.

Working Example 5

Synthesis Example 5

The FEP was synthesized in the same manner as in the synthesis example 1. Then, in the same manner as in the synthesis example 1, the melt flow rate at 372 degree C. of the dry powder was measured at the time that the further additional quantity of TFE reached 1,280 lbs. The value of the melt flow rate was 2.8 grams/10 minutes. Moreover, the melting point of the dry powder was 255.6 degree C. After this, 90 lbs. of methanol was added into the autoclave to adjust the molecular weight.

Furthermore, in the same manner as in the synthesis example 1, after a small quantity of sample was collected from the autoclave at the time that the further additional quantity of TFE reached 4,100 lbs. and 5,740 lbs., the samples were dried to obtain 100 grams of dry powder respectively, and the melting point of the dry powders was measured. The melting point of the dry powder at the time that the further additional quantity of TFE reached 4,100 lbs. was 258.4 degree C. The melting point of the dry powder at the time that the further additional quantity of TFE reached 5,740 lbs. was 257.8 degree C.

Additionally, at the end of the polymerization, dry powder was obtained in the same manner as in the synthesis example 1. The melt flow rate at 372 degree C. of the dry powder was 15.1 grams/10 minutes. Furthermore, the melting point of the dry powder was 258.7 degree C.

After this, after the dry powder was pelletized at 380 degree C. with a twin screw extruder, and the deaeration of the pellet was carried out at 200 degree C. for 8 hours. The melt flow rate at 372 degree C. of the pellet was 29.6 grams/10 minutes.
Measurement of Properties
(1) Measurement of Basic Properties Note that the basic properties of the FEP obtained from the synthesis example 5 was measured by the measuring method shown in the working example 1. The composition of the FEP of the synthesis example 5 was TFE 88.0:HFP 11.0:PPVE 1.0 in weight ratio.

Additionally, the melt tension, the complex viscosity, and the storage modulus of the FEP obtained in the synthesis example 5 were also determined as in the same manner as in the working example 1. As result, the melt tension was 0.09N, the complex viscosity was $3.14×10^3$ Pa*s, and the storage modulus was 0.15.
(2) Online Evaluation for Extrusion Coating Extrusion coating an electrical wire was carried out using the FEP of the synthesis example 5 in the same manner as in the working example 1. After this, evaluation for the extrusion coating was carried out in the same manner as in the working example 1. As a result, the frequency of occurrence of a lump was shown in table 3. The stability of the diameter of the extrusion coated wire (Cp) was 1.4. The stability of the capacitance of the extrusion coated wire (Cp) was 1.5. Generation of Die-Drool was very few.

TABLE 3

| Height of lump (mil) | Number of occurrence (/2 hours) |
|---|---|
| More than or equal to 10 mil, less than 20 mil | 10 |
| More than or equal to 20 mil, less than 30 mil | 2 |
| More than or equal to 30 mil, less than 40 mil | 1 |
| More than or equal to 40 mil, less than 50 mil | 1 |

Working Example 6

Synthesis Example 6

The pellet was treated in the same as in the synthesis example 2 except that the pellet obtained in the synthesis example 1 was replaced with the pellet obtained in the synthesis example 5.

The composition of the pellet after the reaction was TFE 88.0:HFP 11.0:PPVE 1.0 in weight. The melting point was 257.8 degree C. The MFR at 372 degree C. was 29.9 g/10 minutes. The sum of the number of thermally unstable end group and the number of —$CF_2H$ end group per $1×10^6$ carbon atoms was 0. The dielectric constant was 2.03. The dielectric tangent was $3.9×10^{-4}$.

Moreover, the melt tension was 0.09 N, the complex viscosity was $3.08×10^3$ Pa*s, and the storage modulus was 0.14.

Note that the measuring method of the number of thermally unstable end group, the measuring method of the number of —$CF_2H$ end group, and the measuring method of the dielectric constant and the dielectric tangent are as indicated in the production example 1.

Production Example 3

A coaxial cable of RF113 was prepared in the same manner as in the production example 1 except that the FEP of the synthesis example 6 was used as an insulating coating material (core material) and the FEP of the synthesis example 6 was used as a protective coating (sheath material).

The attenuation of the coaxial cable obtained was measured with a network analyzer of HP8510C (Hewlett-Packard Development Company, L.P.). As a result, the attenuation was 5.2 dB/meter at 6 GHz.

Working Example 7

Synthesis Example 7

The FEP was synthesized in the same manner as in the synthesis example 1 except that the inner pressure of the autoclave before 51.8 lbs. of 8 wt % DHP perfluorohexane solution was added thereinto was set at 152.1 psi. Then, in the same manner as in the synthesis example 1, the melt flow rate at 372 degree C. of the dry powder was measured at the time that the further additional quantity of TFE reached 1,280 lbs. The value of the melt flow rate was 1.0 grams/10 minutes. Moreover, the melting point of the dry powder was 258.5 degree C. After this, 115 lbs. of methanol was added into the autoclave to adjust the molecular weight.

Furthermore, after a small quantity of sample was collected from the autoclave at the time that the further additional quantity of TFE reached 4,100 lbs. and 5,740 lbs., the samples were dried to obtain 100 grams of dry powder respectively, and the melting point of the dry powders was measured. The melting point of the dry powder at the time that the further additional quantity of TFE reached 4,100 lbs. was 256.4 degree C. The melting point of the dry powder at the time that the further additional quantity of TFE reached 5,740 lbs. was 255.8 degree C.

Additionally, dry power was obtained at the end of the polymerization in the same manner as in the synthesis example 1, and the melt flow rate at 372 degree C. of the dry powder was measured to be 27.1 grams/10 minutes. Furthermore, the melting point of the dry powder was 255.6 degree C.

After this, in the same manner as in the synthesis example 1, after the dry powder was pelletized at 370 degree C. with a twin screw extruder, and the deaeration of the pellet was carried out at 200 degree C. for 8 hours. The melt flow rate at 372 degree C. of the pellet was 35.0 grams/10 minutes.
Measurement of Properties
(1) Measurement of Basic Properties Note that the basic properties of the FEP obtained from the synthesis example 7 was measured by the measuring method shown in the working example 1. The composition of the FEP of the synthesis example 7 was TFE 87.8:HFP 11.2:PPVE 1.0 in weight ratio.

Additionally, the melt tension, the complex viscosity, and the storage modulus of the FEP obtained in the synthesis example 7 were also determined in the same manner as in the working example 1. As a result, the melt tension was 0.12N, the complex viscosity was $3.01×10^3$ Pa*s, and the storage modulus was 0.45.

(2) Online Evaluation for Extrusion Coating

Extrusion coating an electrical wire was carried out using the FEP of the synthesis example 7 in the same manner as in the working example 1. After this, evaluation for the extrusion coating was carried out in the same manner as in the working example 1. As a result, the frequency of occurrence of a lump was shown in table 4. The stability of the diameter of the extrusion coated wire (Cp) was 1.1. The stability of the capacitance of the extrusion coated wire (Cp) was 1.1. Generation of Die-Drool was very few.

TABLE 4

| Height of lump (mil) | Number of occurrence (/2 hours) |
|---|---|
| More than or equal to 10 mil, less than 20 mil | 7 |
| More than or equal to 20 mil, less than 30 mil | 3 |
| More than or equal to 30 mil, less than 40 mil | 2 |
| More than or equal to 40 mil, less than 50 mil | 1 |

Working Example 8

Synthesis Example 8

The pellet was treated in the same as in the synthesis example 2 except that the pellet obtained in the synthesis example 1 was replaced with the pellet obtained in the synthesis example 7.

The composition of the pellet after the reaction was TFE 87.8:HFP 11.2:PPVE 1.0 in weight. The melting point was 255.0 degree C. The MFR at 372 degree C. was 36.1 g/10 minutes. The sum of the number of thermally unstable end group and the number of —$CF_2H$ end group per $1×10^6$ carbon atoms was 0. The dielectric constant was 2.03. The dielectric tangent was $3.9×10^{-4}$.

Moreover, the melt tension was 0.12 N, the complex viscosity was $2.89×10^3$ Pa*s, and the storage modulus was 0.43.

Note that the measuring method of the number of thermally unstable end group, the measuring method of the number of —$CF_2H$ end group, and the measuring method of the dielectric constant and the dielectric tangent are as indicated in the production example 1.

Production Example 4

A coaxial cable of RF113 was prepared in the same manner as in the production example 1 except that the FEP of the synthesis example 2 was replaced with the FEP of the synthesis example 8.

The attenuation of the coaxial cable obtained was measured with a network analyzer of HP8510C (Hewlett-Packard Development Company, L.P.). As a result, the attenuation was 5.2 dB/meter at 6 GHz.

Working Example 9

Synthesis Example 9

The FEP was synthesized in the same manner as in the synthesis example 1. Then, in the same manner as in the synthesis example 1, the melt flow rate at 372 degree C. of the dry powder was measured at the time that the further additional quantity of TFE reached 1,280 lbs. The value of the melt flow rate was 2.3 grams/10 minutes. Moreover, the melting point of the dry powder was 257.8 degree C. After this, 90 lbs. of methanol was added into the autoclave to adjust the molecular weight.

Furthermore, in the same manner as in the synthesis example 1, after a small quantity of sample was collected from the autoclave at the time that the further additional quantity of TFE reached 4,100 lbs. and 5,740 lbs., the samples were dried to obtain 100 grams of dry powder respectively, and the melting point of the dry powders was measured. The melting point of the dry powder at the time that the further additional quantity of TFE reached 4,100 lbs. was 256.5 degree C. The melting point of the dry powder at the time that the further additional quantity of TFE reached 5,740 lbs. was 255.0 degree C.

Additionally, dry power was obtained at the end of the polymerization in the same manner as in the synthesis example 1, and the melt flow rate at 372 degree C. of the dry powder was measured to be 15.5 grams/10 minutes. Furthermore, the melting point of the dry powder was 254.9 degree C.

After this, after the dry powder was pelletized at 404 degree C. with a single screw extruder, and the deaeration of the pellet was carried out at 200 degree C. for 8 hours. The melt flow rate at 372 degree C. of the pellet was 20.0 grams/10 minutes.

Measurement of Properties
(1) Measurement of Basic Properties

Note that the basic properties of the FEP obtained from the synthesis example 9 was measured by the measuring method shown in the working example 1. The composition of the FEP of the synthesis example 9 was TFE 87.8:HFP 11.2:PPVE 1.0 in weight ratio.

Additionally, the melt tension, the complex viscosity, and the storage modulus of the FEP obtained in the synthesis example 9 were also determined in the same manner as in the working example 1. As a result, the melt tension was 0.13N, the complex viscosity was 5.98×10$^3$ Pa*s, and the storage modulus was 1.01.

(2) Online Evaluation for Extrusion Coating

Extrusion coating an electrical wire was carried out using the FEP of the synthesis example 9 in the same manner as in the working example 1. After this, evaluation for the extrusion coating was carried out in the same manner as in the working example 1. As a result, the frequency of occurrence of a lump was shown in table 5. The stability of the diameter of the extrusion coated wire (Cp) was 1.1. The stability of the capacitance of the extrusion coated wire (Cp) was 2. Generation of Die-Drool was very few.

TABLE 5

| Height of lump (mil) | Number of occurrence (/2 hours) |
|---|---|
| More than or equal to 10 mil, less than 20 mil | 6 |
| More than or equal to 20 mil, less than 30 mil | 0 |
| More than or equal to 30 mil, less than 40 mil | 0 |
| More than or equal to 40 mil, less than 50 mil | 2 |

Working Example 10

Synthesis Example 10

The pellet was treated in the same as in the synthesis example 2 except that the pellet obtained in the synthesis example 1 was replaced with the pellet obtained in the synthesis example 9.

The composition of the pellet after the reaction was TFE 87.8:HFP 11.2:PPVE 1.0 in weight. The melting point was 255.0 degree C. The MFR at 372 degree C. was 20.6 g/10 minutes. The sum of the number of thermally unstable end group and the number of —CF$_2$H end group per 1×10$^6$ carbon atoms was 0. The dielectric constant was 2.00. The dielectric tangent was 3.8×10$^{-4}$.

Moreover, the melt tension was 0.13 N, the complex viscosity was 5.71×10$^3$ Pa*s, and the storage modulus was 0.95.

Note that the measuring method of the number of thermally unstable end group, the measuring method of the number of —CF$_2$H end group, and the measuring method of the dielectric constant and the dielectric tangent are as indicated in the production example 1.

Production Example 5

A coaxial cable of RF113 was prepared in the same manner as in the production example 1 except that the FEP of the synthesis example 2 was replaced with the FEP of the synthesis example 10.

The attenuation of the coaxial cable obtained was measured with a network analyzer of HP8510C (Hewlett-Packard Development Company, L.P.). As a result, the attenuation was 5.1 dB/meter at 6 GHz.

Working Example 11

Synthesis Example 11

The FEP was synthesized in the same manner as in the synthesis example 1. Then, in the same manner as in the synthesis example 1, the melt flow rate at 372 degree C. of the dry powder was measured at the time that the further additional quantity of TFE reached 1,280 lbs. The value of the melt flow rate was 2.5 grams/10 minutes. Moreover, the melting point of the dry powder was 256.7 degree C. After this, 95 lbs. of methanol was added into the autoclave to adjust the molecular weight.

Furthermore, in the same manner as in the synthesis example 1, after a small quantity of sample was collected from the autoclave at the time that the further additional quantity of TFE reached 4,100 lbs. and 5,740 lbs., the samples were dried to obtain 100 grams of dry powder respectively, and the melting point of the dry powders was measured. The melting point of the dry powder at the time that the further additional quantity of TFE reached 4,100 lbs. was 254.8 degree C. The melting point of the dry powder at the time that the further additional quantity of TFE reached 5,740 lbs. was 255.5 degree C.

Additionally, dry power was obtained at the end of the polymerization in the same manner as in the synthesis example 1, and the melt flow rate at 372 degree C. of the dry powder was measured to be 16.1 grams/10 minutes. Furthermore, the melting point of the dry powder was 256.9 degree C.

After this, after the dry powder was pelletized at 396 degree C. with a single screw extruder, and the deaeration of the pellet was carried out at 200 degree C. for 8 hours.

The melt flow rate at 372 degree C. of the pellet was 18.2 grams/10 minutes.

Measurement of Properties
(1) Measurement of Basic Properties

Note that the basic properties of the FEP obtained from the synthesis example 11 was measured by the measuring method shown in the working example 1. The composition of the FEP of the synthesis example 11 was TFE 87.9:HFP 11.1:PPVE 1.0 in weight ratio.

Additionally, the melt tension, the complex viscosity, and the storage modulus of the FEP obtained in the synthesis example 11 were also determined in the same manner as in the working example 1. As a result, the melt tension was 0.14N, the complex viscosity was $6.75 \times 10^3$ Pa*s, and the storage modulus was 1.30.

(2) Online Evaluation for Extrusion Coating

Extrusion coating an electrical wire was carried out using the FEP of the synthesis example 11 in the same manner as in the working example 1. After this, evaluation for the extrusion coating was carried out in the same manner as in the working example 1. As a result, the frequency of occurrence of a lump was shown in table 6. The stability of the diameter of the extrusion coated wire (Cp) was 1.1. The stability of the capacitance of the extrusion coated wire (Cp) was 1.1. Generation of Die-Drool was very few.

TABLE 6

| Height of lump (mil) | Number of occurrence (/2 hours) |
|---|---|
| More than or equal to 10 mil, less than 20 mil | 5 |
| More than or equal to 20 mil, less than 30 mil | 2 |
| More than or equal to 30 mil, less than 40 mil | 1 |
| More than or equal to 40 mil, less than 50 mil | 2 |

Working Example 12

Synthesis Example 12

The pellet was treated in the same as in the synthesis example 2 except that the pellet obtained in the synthesis example 1 was replaced with the pellet obtained in the synthesis example 11.

The composition of the pellet after the reaction was TFE 87.9:HFP 11.1:PPVE 1.0 in weight. The melting point was 255.1 degree C. The MFR at 372 degree C. was 18.5 g/10 minutes. The sum of the number of thermally unstable end group and the number of —$CF_2H$ end group per $1 \times 10^6$ carbon atoms was 0. The dielectric constant was 2.00. The dielectric tangent was $3.8 \times 10^{-4}$.

Moreover, the melt tension was 0.14 N, the complex viscosity was $6.50 \times 10^3$ Pa*s, and the storage modulus was 1.21.

Note that the measuring method of the number of thermally unstable end group, the measuring method of the number of —$CF_2H$ end group, and the measuring method of the dielectric constant and the dielectric tangent are as indicated in the production example 1.

Production Example 6

A coaxial cable of RF113 was prepared in the same manner as in the production example 1 except that the FEP of the synthesis example 2 was replaced with the FEP of the synthesis example 12.

The attenuation of the coaxial cable obtained was measured with a network analyzer of HP8510C (Hewlett-Packard Development Company, L.P.). As a result, the attenuation was 5.1 dB/meter at 6 GHz.

Working Example 13

Synthesis Example 13

The FEP was synthesized in the same manner as in the synthesis example 1. Then, in the same manner as in the synthesis, example 1, the melt flow rate at 372 degree C. of the dry powder was measured at the time that the further additional quantity of TFE reached 1,280 lbs. The value of the melt flow rate was 1.9 grams/10 minutes. Moreover, the melting point of the dry powder was 256.1 degree C. After this, 95 lbs. of methanol was added into the autoclave to adjust the molecular weight.

Furthermore, in the same manner as in the synthesis example 1, after a small quantity of sample was collected from the autoclave at the time that the further additional quantity of TFE reached 4,100 lbs. and 5,740 lbs., the samples were dried to obtain 100 grams of dry powder respectively, and the melting point of the dry powders was measured. The melting point of the dry powder at the time that the further additional quantity of TFE reached 4,100 lbs. was 255.7 degree C. The melting point of the dry powder at the time that the further additional quantity of TFE reached 5,740 lbs. was 254.8 degree C.

Additionally, dry power was obtained at the end of the polymerization in the same manner as in the synthesis example 1, and the melt flow rate at 372 degree C. of the dry powder was measured to be 17.0 grams/10 minutes. Furthermore, the melting point of the dry powder was 256.1 degree C.

After this, after the dry powder was pelletized at 370 degree C. with a twin screw extruder, and the deaeration of the pellet was carried out at 200 degree C. for 8 hours. The melt flow rate at 372 degree C. of the pellet was 24.5 grams/10 minutes.

Measurement of Properties
(1) Measurement of Basic Properties

Note that the basic properties of the FEP obtained from the synthesis example 13 was measured by the measuring method shown in the working example 1. The composition of the FEP of the synthesis example 13 was TFE 87.9:HFP 11.1:PPVE 1.0 in weight ratio.

Additionally, the melt tension, the complex viscosity, and the storage modulus of the FEP obtained in the synthesis example 13 were also determined in the same manner as in the working example 1. As a result, the melt tension was 0.12N, the complex viscosity was $4.06 \times 10^3$ Pa*s, and the storage modulus was 0.61.

(2) Online Evaluation for Extrusion Coating

Extrusion coating an electrical wire was carried out using the FEP of the synthesis example 13 in the same manner as in the working example 1. After this, evaluation for the extrusion coating was carried out in the same manner as in the working example 1. As a result, the frequency of occurrence of a lump was shown in table 7. The stability of the diameter of the extrusion coated wire (Cp) was 1.2. The stability of the capacitance of the extrusion coated wire (Cp) was 1.4. Generation of Die-Drool was very few.

TABLE 7

| Height of lump (mil) | Number of occurrence (/2 hours) |
| --- | --- |
| More than or equal to 10 mil, less than 20 mil | 6 |
| More than or equal to 20 mil, less than 30 mil | 1 |
| More than or equal to 30 mil, less than 40 mil | 2 |
| More than or equal to 40 mil, less than 50 mil | 0 |

Working Example 14

Synthesis Example 14

The pellet was treated in the same as in the synthesis example 2 except that the pellet obtained in the synthesis example 1 was replaced with the pellet obtained in the synthesis example 13.

The composition of the pellet after the reaction was TFE 87.9:HFP 11.1:PPVE 1.0 in weight. The melting point was 255.0 degree C. The MFR at 372 degree C. was 25.1 g/10 minutes. The sum of the number of thermally unstable end group and the number of —$CF_2H$ end group per $1 \times 10^6$ carbon atoms was 0. The dielectric constant was 2.01. The dielectric tangent was $3.8 \times 10^4$.

Moreover, the melt tension was 0.12 N, the complex viscosity was $3.91 \times 10^3$ Pa*s, and the storage modulus was 0.57.

Note that the measuring method of the number of thermally unstable end group, the measuring method of the number of —$CF_2H$ end group, and the measuring method of the dielectric constant and the dielectric tangent are as indicated in the production example 1.

Production Example 7

A coaxial cable of RF113 was prepared in the same manner as in the production example 1 except that the FEP of the synthesis example 2 was replaced with the FEP of the synthesis example 14.

The attenuation of the coaxial cable obtained was measured with a network analyzer of HP8510C (Hewlett-Packard Development Company, L.P.). As a result, the attenuation was 5.1 dB/meter at 6 GHz.

Working Example 15

Extrusion coating an electrical wire and evaluation for the extrusion coating was carried out in the same manner as in the working example 1 except that the pellet obtained in the synthesis example 1 was replaced with the pellet obtained in the synthesis example 14. As a result, the frequency of occurrence of a lump was shown in table 8. The stability of the diameter of the extrusion coated wire (Cp) was 1.2. The stability of the capacitance of the extrusion coated wire (Cp) was 1.4. Generation of Die-Drool was very few.

TABLE 8

| Height of lump (mil) | Number of occurrence (/2 hours) |
| --- | --- |
| More than or equal to 10 mil, less than 20 mil | 5 |
| More than or equal to 20 mil, less than 30 mil | 0 |
| More than or equal to 30 mil, less than 40 mil | 1 |
| More than or equal to 40 mil, less than 50 mil | 0 |

Working Example 16

The master batch pellet was prepared by mixing the pellet obtained in the synthesis example 14 and boron nitride (BN, Grade: SHP-325, average particle diameter: 10.3 µm, manufactured by CARBORUNDUM Company) so that the concentration of the boron nitride can be 7.5 wt %. After this, the pellet obtained in the synthesis example 14 and the master batch pellet were mixed together at the ratio of 9 to 1. And coating an electrical wire with foamed FEP was carried out under the condition described below. The condition for the coating an electrical wire with the foamed FEP
 a) Conductive core: soft copper wire, the diameter of the wire: 0.7 mm
 b) Coating thickness: 0.2 mm
 c) Diameter of an coated wire: 1.1 mm
 d) Take-over speed of an electrical wire: 1,000 feet/minute
 e) Pressure for introduction of nitrogen: 34.0 MPa
 f) Condition for melt molding (extrusion)
 Diameter of shaft of cylinder=35 mm. A single screw extruder with L/D=30
 Die (inner diameter)/chip (outer diameter)=4.7 mm/2.2 mm
 Preset temperature of the extruder: barrel part of Z1 (330 degree C.), barrel part of Z2 (350 degree C.), barrel part of Z3 (370 degree C.), barrel part of Z4 (370 degree C.), barrel part of Z5 (370 degree C.), clamp part (375 degree C.), adapter part (370 degree C.), crosshead part (365 degree C.), die part (360 degree C.), preheating temperature for a core cable (140 degree C.)
 length of a melt cone during the coating=2.0 mm Note that the coating an electrical wire with foamed FEP was carried out for an hour. The spark out, the stability of the diameter of the coated wire and the stability of the capacitance of the coated wire of the foamed wire were measured in the same manner as in the working example 1. Moreover, the foaming rate and the average pore diameter of the foamed coating were measured. Furthermore, the surface state of the foamed wire was observed.

As a result, the spark out was 0 time/hour. The stability of the diameter of the extrusion coated wire (Cp) was 1.1. The stability of the capacitance of the extrusion coated wire (Cp) was 1.1. The foaming rate was 24%. The average pore diameter was 23 µm. The surface state was excellent.

(1) Foaming Rate

After approximately 50 cm of the coating is peeled off from the conductive core, the outer diameter, the inner diameter and the length of the coating was measured to calculate the volume of the coating. Next, the weight of the coating was measured. Then, the weight was divided by the volume to obtain the density (d: g/cm3) of the coating.

Forming rate (%)=(1−d/2.15)×100

(2.15 in the formula above is the absolute specific gravity of non-foamed FEP)

(2) Average Pore Diameter

After the photography of the cross sectional view of the foamed wire was taken with a scanning electron microscope, the diameter of each of the pores in the photograph was measured. Then, the diameter of the pores is averaged to obtain the average pore diameter.

(3) Evaluation of Surface State

Evaluation of the surface state of the foamed wire was carried out by running fingers across the foamed wire. The evaluation standard is below.

Excellent—Smooth
Good—A little Rough
Not Good—Very Rough

Comparative Example 1

Comparative Synthesis Example 1

8163.5 lbs. of deionized water (including 3.5 lbs. of ammonium w-hydroxyfluorocarbonate) was added into a glass-lined autoclave with an agitator (12,000 L volume). After that, the autoclave was vacuumed and filled with nitrogen gas well. After this, after the autoclave was vacuumed, 8460 lbs. of HFP was added into the autoclave. While the deionized water and HFP were agitated vigorously in the autoclave, the inner temperature was set at 93.2 F. Next, after 92 lbs. of PPVE were added into the autoclave, TFE was continuously added, until the inner pressure of the autoclave reached 151.0 psi, additionally 99.2 lbs. of 8 wt % di(ω-hydroperfluorohexanoyl) peroxide (abbreviated to "DHP" in the following) perfluorohexane solution was added into the autoclave to initiate polymerization. 99.2 lbs. of 8 wt % DHP perfluorohexane solution was added into the autoclave, and 0.3 psig of the inner pressure was reduced 2 hours later and 4 hours later from the initiation of the polymerization. Furthermore, 39.8 lbs. of 8 wt % DHP perfluorohexane solution was added into the autoclave, and 0.3 psig of the inner pressure was reduced 6 hours later, 8 hours later and 10 hours later from the initiation of the polymerization. Moreover, 1.0 psig of the inner pressure was reduced respectively in ninth and twelfth addition of DHP perfluorohexane solution counted from the addition of DHP perfluorohexane solution at the initiation of polymerization. Note that TFE was continuously charged into the autoclave during the polymerization, 21.1 lbs. of PPVE was added into the autoclave respectively at the time that the total quantity of TFE reached 1,640 lbs., 3,280 lbs. and 4,920 lbs. After a small quantity of sample was collected from the autoclave at the time that the further additional quantity of TFE reached 1,280 lbs., the sample was dried to obtain 100 grams of dry powder, and the melt flow rate at 372 degree C. of the dry powder was measured. The value of the melt flow rate was 18.0 grams/10 minutes. Furthermore, the quantity of polymer at this time corresponds to 15.6 wt % of the quantity of the polymer at the end of the polymerization. Moreover, the melting point of the dry powder was 249.7 degree C. After this, 85 lbs. of methanol was added into the autoclave.

Furthermore, after a small quantity of sample was collected from the autoclave at the time that the further additional quantity of TFE reached 3,280 lbs., 4,100 lbs., 4,920 lbs., and 5,740 lbs., the samples were dried to obtain 100 grams of dry powder respectively, and the melting point of the dry powders was measured. The melt flow rate at 372 degree C. and melting point of the dry powder at the time that the further additional quantity of TFE reached 3,280 lbs. were respectively 20.1 grams/10 minutes and 251.5 degree C. The melt flow rate at 372 degree C. and the melting point of the dry powder at the time that the further additional quantity of TFE reached 4,100 lbs. were respectively 21.7 grams/10 minutes and 253.0 degree C. Furthermore, the quantity of polymer at the time the further additional quantity of TFE reached 4,100 lbs. corresponds to 50.0 wt % of the quantity of the polymer at the end of the polymerization. The melt flow rate at 372 degree C. and the melting point of the dry powder at the time that the further additional quantity of TFE reached 4,920 lbs. were respectively 21.5 grams/10 minutes and 254.6 degree C. The melt flow rate at 372 degree C. and the melting point of the dry powder at the time that the further additional quantity of TFE reached 5,740 lbs. were respectively 20.3 grams/10 minutes and 256.0 degree C. The polymerization was terminated when the total quantity of TFE reached 8,200 lbs. After the termination of the polymerization, unreacted TFE and HFP were released from the autoclave to obtain wet powder. Water was added to the wet powder to wash it in agitation. After this, the wet powder was dried at 150 degree C. for 10 hours to obtain 9,500 lbs. of dry powder. The melt flow rate at 372 degree C. of the dry powder was 18.3 grams/10 minutes. Furthermore, the melting point of the dry powder was 257.7 degree C. After this, after the dry powder was pelletized at 370 degree C. with a twin screw extruder, the deaeration of the pellet was carried out at 200 degree C. for 8 hours. The melt flow rate at 372 degree C. of the pellet was 24.0 grams/10 minutes.

Measurement of Properties (1) Measurement of Basic Properties

Note that the basic properties of the FEP obtained in the comparative synthesis example 1 was measured by the measuring method shown in the working example 1. The melting point of the FEP obtained in the comparative synthesis example 1 (the FEP was pelletized) was 257.1 degree C. The composition of the FEP of the comparative synthesis example 1 was TFE 87.9:HFP 11.1:PPVE 1.0 in weight ratio. The sum of the number of thermally unstable end group and the number of —$CF_2H$ end group per $1 \times 10^6$ carbon atoms was 563. The dielectric constant was 2.03. The dielectric tangent was $14.0 \times 10^{-4}$.

Additionally, the melt tension, the complex viscosity, and the storage modulus of the FEP obtained in the comparative synthesis example 1 were also determined as in the same manner as in the working example 1. As a result, the melt tension was 0.07N, the complex viscosity was $3.46 \times 10^3$ Pa*s, and the storage modulus was 0.05.

Note that the measuring method of the number of thermally unstable end group, the measuring method of the number of —$CF_2H$ end group, and the measuring method of the dielectric constant and the dielectric tangent are as indicated in the production example 1.

(2) Online Evaluation for Extrusion Coating

Extrusion coating an electrical wire was carried out using the FEP of the comparative synthesis example 1 in the same manner as in the working example 1. After this, evaluation for the extrusion coating was carried out in the same manner as in the working example 1. As a result, the frequency of occurrence of a lump was shown in table 9. The stability of the diameter of the extrusion coated wire (Cp) was 1.0. The stability of the capacitance of the extrusion coated wire (Cp) was 1.0. Generation of Die-Drool was few.

TABLE 9

| Height of lump (mil) | Number of occurrence (/2 hours) |
|---|---|
| More than or equal to 10 mil, less than 20 mil | 13 |
| More than or equal to 20 mil, less than 30 mil | 5 |
| More than or equal to 30 mil, less than 40 mil | 3 |
| More than or equal to 40 mil, less than 50 mil | 4 |

Comparative Example 2

Comparative Production Example 1

A coaxial cable of RF113 was prepared in the same manner as in the production example 1 except that the FEP of the synthesis example 2 was replaced with the FEP of the comparative synthesis example 1.

The attenuation of the coaxial cable obtained was measured with a network analyzer of HP8510C (Hewlett-Packard Development Company, L.P.). As a result, the attenuation was 5.6 dB/meter at 6 GHz.

Comparative Example 3

Comparative Synthesis Example 2

270.1 kg of deionized water (including 0.1 kg of ammonium ω-hydroxyfluorocarbonate) was added into a glass-lined autoclave with an agitator (1,000 L volume). After that, the autoclave was vacuumed and filled with nitrogen gas well. After this, after the autoclave was vacuumed, 233 kg of HFP was added into the autoclave. While the deionized water and HFP were agitated vigorously in the autoclave, the inner temperature was set at 29.0 degree C. Next, after 2.6 kg of PPVE were added into the autoclave, TFE was continuously added until the inner pressure of the autoclave reached 0.9 MPa, additionally 3.8 kg of 8 wt % di(ω-hydroperfluorohexanoyl) peroxide (abbreviated to "DHP" in the following) perfluorohexane solution was added into the autoclave to initiate polymerization. During the polymerization, TFE was continuously charged into the autoclave to maintain the inner pressure of the autoclave at 0.9 MPa. 3.8 kg of 8 wt % DHP perfluorohexane solution was respectively added into the autoclave 3 hours later, 8 hours later and 13 hours later from the initiation of the polymerization. Additionally, 1.9 kg of 8 wt % DHP perfluorohexane solution was respectively added into the autoclave 18 hours later, 23 hours later, 28 hours later and 33 hours later from the initiation of the polymerization. 0.7 kg of PPVE was added into the autoclave respectively at the time that the total quantity of TFE reached 61.6 kg, 123.3 kg and 185 kg. After a small quantity of sample was collected from the autoclave 5 hours later from the initiation of the polymerization, the sample was dried to obtain 100 grams of dry powder, and the melt flow rate at 372 degree C. of the dry powder was measured. The value of the melt flow rate was 18.3 grams/10 minutes. After this, 1.7 kg of methanol was added into the autoclave. The polymerization was terminated 37 hours later from the initiation of the polymerization. At this time, the total quantity of TFE reached 308 kg. After the termination of the polymerization, unreacted TFE and HFP were released from the autoclave to obtain wet powder. Water was added to the wet powder to wash it in agitation. After this, the wet powder was dried at 150 degree C. for 24 hours to obtain 322 kg of dry powder. The melt flow rate at 372 degree C. of the dry powder was 17.5 grams/10 minutes. Furthermore, the melting point of the dry powder was 256.4 degree C. After this, after the dry powder was pelletized at 370 degree C. with a twin screw extruder, the deaeration of the pellet was carried out at 200 degree C. for 8 hours. The melt flow rate at 372 degree C. of the pellet was 25.1 grams/10 minutes.

Measurement of Properties (1) Measurement of Basic Properties

Note that the basic properties of the FEP obtained in the comparative synthesis example 2 was measured by the measuring method shown in the working example 1. The composition of the FEP of the comparative synthesis example 2 was TFE 87.9:HFP 11.1:PPVE 1.0 in weight ratio.

Additionally, the melt tension, the complex viscosity, and the storage modulus of the FEP obtained in the comparative synthesis example 2 were also determined as in the same manner as in the working example 1. As a result, the melt tension was 0.07N, the complex viscosity was $3.32 \times 10^3$ Pa*s, and the storage modulus was 0.06.

(2) Online Evaluation for Extrusion Coating

Extrusion coating an electrical wire was carried out using the FEP of the comparative synthesis example 2 in the same manner as in the working example 1. After this, evaluation for the extrusion coating was carried out in the same manner as in the working example 1. As a result, the frequency of occurrence of a lump was shown in table 10. The stability of the diameter of the extrusion coated wire (Cp) was 1.0. The stability of the capacitance of the extrusion coated wire (Cp) was 1.0. Generation of Die-Drool was few.

TABLE 10

| Height of lump (mil) | Number of occurrence (/2 hours) |
|---|---|
| More than or equal to 10 mil, less than 20 mil | 14 |
| More than or equal to 20 mil, less than 30 mil | 5 |
| More than or equal to 30 mil, less than 40 mil | 3 |
| More than or equal to 40 mil, less than 50 mil | 3 |

The FEP of this invention has features, such as capability to improve moldability in melt extrusion molding, especially significant reduction of defects in high-speed extrusion coating of an electrical wire and capability to manufacture an electrical wire with smaller transmission loss (attenuation), and highly contributes to reduction of the cost for manufacturing an electrical wire and improvement of performance of the electrical wire.

What is claimed is:

1. A fluoropolymer composition including tetrafluoroethylene/hexafluoropropylene copolymer made from at least tetrafluoroethylene, hexafluoropropylene and a third monomer and not including a resin having a melting point at least 20 degrees C. different from the melting point of the tetrafluoroethylene/hexafluoropropylene copolymer; and the fluoropolymer composition having a complex viscosity of from $2.0 \times 10^3$ to $10.0 \times 10^3$ Pa*s and a storage modulus of from 0.2 to 3.5 Pa in melt viscoelasticity measurement under a condition of atmosphere temperature of 310 degree C. and angular frequency of 0.01 radian/second, a weight ratio of the third monomer to a total weight of the tetrafluoroethylene, the hexafluoropropylene and the third monomer being 1.0 to 10 parts by weight, and a melt flow rate at 372 degree C. being 20 grams/10 minutes or more.

2. The fluoropolymer composition according to claim 1, wherein
the tetrafluoroethylene/hexafluoropropylene copolymer is obtained in a process without a mixing process different from a polymerization process.

3. The fluoropolymer composition according to claim 2, wherein
melt tension at 372 degree C. is from 0.08 to 0.16 N.

4. The fluoropolymer composition according to claim 3, wherein
a sum of a number of thermally unstable end groups and the number of —$CF_2H$ end groups per $1\times10^6$ carbon atoms is fewer than or equal to 50.

5. The fluoropolymer composition according to claim 2, wherein
a sum of a number of thermally unstable end groups and the number of —$CF_2H$ end groups per $1\times10^6$ carbon atoms is fewer than or equal to 50.

6. The fluoropolymer composition according to claim 1, wherein
melt tension at 372 degree C. is from 0.08 to 0.16 N.

7. The fluoropolymer composition according to claim 6, wherein
a sum of a number of thermally unstable end groups and the number of —$CF_2H$ end groups per $1\times10^6$ carbon atoms is fewer than or equal to 50.

8. The fluoropolymer composition according to claim 1, wherein
a sum of a number of thermally unstable end groups and the number of —$CF_2H$ end groups per $1\times10^6$ carbon atoms is fewer than or equal to 50.

9. The fluoropolymer composition according to claim 1, wherein
the third monomer is perfluorovinylether.

10. The fluoropolymer composition according to claim 1, wherein
the third monomer is perfluoro (propylvinylether).

11. The fluoropolymer composition according to claim 1, wherein
the weight ratio of the third monomer to the total weight of the tetrafluoroethylene, the hexafluoropropylene and the third monomer is 3 parts by weight or less.

12. The fluoropolymer composition according to claim 1, wherein
the melt flow rate at 372 degree C. is 60 grams/10 minutes or less.

13. The fluoropolymer composition according to claim 1, wherein
the melt flow rate at 372 degree C. is 40 grams/10 minutes or less.

14. The fluoropolymer composition according to claim 1, wherein
a weight ratio of hexafluoropropylene to the total weight of the tetrafluoroethylene, the hexafluoropropylene and the third monomer is 4 to 11.2 parts by weight.

* * * * *